United States Patent Office 3,646,143
Patented Feb. 29, 1972

3,646,143
PROCESS FOR CONVERTING AN OLEFIN TO A PRODUCT CONTAINING HIGHER AND LOWER OLEFINS
Alan F. Ellis, Murrysville, and Edward T. Sabourin, Allison Park, Pa., assignors to Gulf Research and Development Company, Pittsburgh, Pa.
No Drawing. Continuation-in-part of application Ser. No. 821,945, May 5, 1969. This application Aug. 25, 1969, Ser. No. 852,878
Int. Cl. C07c 3/62
U.S. Cl. 260—683 D   16 Claims

ABSTRACT OF THE DISCLOSURE

A process for converting, by metathesis, an olefin, particularly an alpha olefin, to a product containing a mixture of olefins of higher and lower carbon number than the olefin charge, which involves contacting the olefin charge with a novel composition containing (1) alumina, (2) cobalt, (3) molybdenum, and (4) silver or copper.

---

This application is a continuation-in-part application of our application Ser. No. 821,945, filed May 5, 1969, entitled Process for Converting an Olefin to a Product Containing Higher and Lower Olefins, now Patent No. 3,595,920.

This invention relates to a process for converting, by metathesis, an olefin, particularly an alpha olefin, or a mixture thereof, to a product containing a mixture of olefins of higher and lower carbon number than the olefin charge, which involves contacting the olefin charge with a novel composition containing (1) alumina, (2) cobalt, (3) molybdenum, and (4) silver or copper. By "metathesis" we mean to include a process wherein two molecules of olefin, the same or different, in the presence of a catalyst and under reaction conditions, interact in a manner such that an olefinic fragment thereof reacts with another olefinic fragment to produce olefins containing combinations of such olefinic fragments. Metathesis as defined herein can be illustrated by the following reaction:

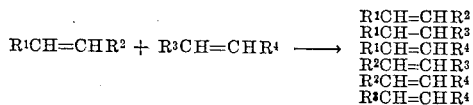

In the above equation $R^1$, $R^2$, $R^3$ and $R^4$, the same or different, can be an alkyl group or hydrogen. By "olefinic fragment" we mean to include each of the "RCH" portions referred to above.

In a preferred embodiment, an alpha olefin charge is employed, isomerization of such charge is inhibited and the main products obtained are olefins composed of combinations of the alkyl-carrying fragments of the olefin charge and ethylene.

The olefin charge employed herein will have from four to 12 carbon atoms, preferably from six to 10 carbon atoms. Of these, normal alpha olefins are preferred. Examples of such olefins include butene-1, 3-methylbutene-1, pentene-2, hexene-1, 4-ethylhexene-2, 5-cyclohexylpentene-1, octene-1, nonene-2, decene-1, 5,6-dimethyloctene-2, undecene-1, dodecene-1, etc.

The metathesis reaction can be effected simply by bringing the olefin charge in contact with the defined novel catalyst under selected reaction conditions. As noted, the catalyst is composed of (1) alumina, (2) cobalt, (3) molybdenum, and (4) silver or copper. By "alumina" we mean to include $Al_2O_3$ conventionally employed in metathesis reactions. The proportion of molybdenum present in the final composition can vary over wide limits, but in general will be present in amounts of about four to 12 percent, preferably about seven to nine percent, based on the total catalyst. The proportion of cobalt present in the final composition can also vary over wide limits, but in general will be present in amounts of about one to four percent, preferably about two to three percent, based on the final catalyst. The proportion of silver or copper present can also be varied over wide limits, but in general will be present in an amount of about 0.1 to about six percent by weight, preferably from about 0.5 to about three percent by weight, based on the total catalyst.

The preparation of the novel catalyst employed herein can be effected in any desirable manner. Thus, we can grind together the defined amounts of alumina, molybdenum and cobalt oxides and silver or copper oxides in preparing the catalyst used herein. A preferred manner, however, involves impregnating the alumina base, by the incipient wetness technique, with a sufficient amount of a salt of molybdenum, for example, ammonium molybdate, from an aqueous solution, to introduce thereon the desired amount of molybdenum, calculated as metal, on the support. The resulting composition is dried, for example, in air at a temperature of about 110° to about 150° C. for about five to about 24 hours and then calcined in air at a temperature of about 400° to about 600° C. over a period of about one to about 24 hours. The base so obtained is then impregnated, by the incipient wetness technique, with a sufficient amount of a salt of cobalt, for example, cobaltous nitrate or cobaltous acetate, from an aqueous solution, to introduce thereon the desired amount of cobalt, calculated as metal, on the support. The resulting composition is dried, for example, in air at a temperature of about 110° to about 150° C. for about five to about 24 hours and then calcined in air at a temperature of about 400° to about 600° C. over a period of about one to about 24 hours. The resulting base is then impregnated, by the incipient wetness technique, with a sufficient amount of a salt of silver, for example, a silver nitrate or silver acetate, or copper, for example, cuprous chloride, cupric nitrate or cupric chloride, from an aqueous solution, to introduce thereon the desired amount of silver or copper, calculated as metal, on the support. The resulting composition is dried, for example, in air at a temperature of about 110° to about 150° C. for about five to about 24 hours, and then calcined in air at a temperature of about 400° to about 600° C. over a period of about one to about 24 hours. The metals in the compositions are believed to be in the oxide form.

The metathesis reaction conditions can be varied over a wide range. Thus, the olefin charge, in liquid form, can be passed over the defined catalyst at a liquid hourly space velocity (liquid volume of olefin feed per volume of catalyst per hour) of about 60 to about 0.2, preferably about 3.0 to about 0.5. The temperature during such treatment is about 90° to about 250° C., preferably about 100° to about 200° C. The pressure is not critical but is desirably low, preferably sufficient to maintain the charge in the reaction system in the liquid phase. Thus, the pressure can be from about 0 pounds to about 500 pounds per square inch gauge, preferably from about 0 to about 100 pounds per square inch gauge. If the above procedure is operated in batch, the same conditions defined above can be used and contact or reaction time can be from about 10 minutes to about 240 minutes, preferably from about 30 minutes to about 120 minutes. The reaction is preferably carried out in the absence of solvents, but if solvents are used they should not adversely affect the course of the reaction nor react with the components of the reaction system but should have a boiling point sufficiently different from that of any of the components present in the reaction system. Thus, non-polar solvents, such as hexane, cetane, decane, etc., can be used. The amount of solvent would be that amount sufficient to maintain the contents of the reaction system in the liquid phase. Thus, on a volume base one volume of solvent per volume of reaction mixture can be used.

Preferably during the process vaporous products, for example, ethylene, are removed from the reaction zone as made. At the end of the reaction period any vaporous products still present are flashed off from the reaction product and the remaining product separated from catalyst in any convenient manner, for example, by filtration or decantation. The individual components of the reaction mixture can the be recovered from the reaction mixture by fractionation by conventional means.

The process defined herein can further be illustrated by the following:

EXAMPLE I

A series of catalysts was prepared from a commercially available base (Ketjenfine 124.1.5E) comprised of oxides of aluminum, cobalt, and molybdenum in the ratio 84:4:12 by impregnation, by the incipient wetness technique, with varying amounts of silver nitrate, from aqueous solutions, to introduce varying amounts of silver, calculated as metal, on the base. The resulting compositions, in each instance, were dried at 120° C. over a period of 18 hours and then calcined at a temperature of 540° C. over a period of 3 hours in a stream of dry nitrogen. The metals in the compositions so prepared are believed to be in the oxide form.

A series of runs was made using the compositions prepared above. In each instance 20 grams thereof were transferred under a nitrogen blanket to a glass column one inch in diameter and six inches in length connected by a ground glass joint to a round bottom flask containing 100 grams of octene-1. The olefin was then refluxed in contact with the catalyst at atmospheric pressure. Volatiles comprising mainly ethylene were permitted to escape from the system. The pot was sampled at intervals through a rubber septum and analyzed by gas-liquid chromatography. The results obtained are summarized below in Table I, showing the molar selectivity of octene-1 to tetradecene-7.

$$\left(\text{Molar Selectivity} = \frac{2 \times \text{mols } C_{14} \text{ olefin} \times 100}{\text{mols } C_8 \text{ olefin converted}}\right)$$

at 50 percent octene-1 conversion.

TABLE I

| Run Number | Weight percent silver | Molar selectivity to tetradecene-7 |
|---|---|---|
| 1 | None | 27.3 |
| 2 | 0.62 | 78.0 |
| 3 | 1.25 | 82.5 |
| 4 | 2.48 | 87.3 |

EXAMPLE II

A similar set of runs was made wherein silver in the composition employed in Example I was replaced with copper. The composition used in this example was prepared in the identical manner used in Example I except that cupric nitrate was used in place of silver nitrate. We believe copper to be present in the final composition in an oxide form. The results obtained are tabulated below in Table II.

TABLE II

| Run Number | Weight percent copper | Molar selectivity to tetradecene-1 |
|---|---|---|
| 5 | 0.87 | 70.1 |
| 6 | 1.74 | 81.1 |
| 7 | 2.70 | 86.4 |

The advantages of operating the metathesis reaction using a catalyst containing alumina, molybdenum and either silver or copper is apparent from an inspection of the above data. In Run No. 1 wherein only alumina and cobalt and molybdenum were present the selectivity of octene-1 to desired tetradecene-7 was only 27.3 percent. The additional presence of small amounts of silver or copper greatly increased the desired selectivity. This selectivity was further increased by the presence of larger amounts of silver or copper.

EXAMPLE III

Additional runs were made using a catalyst composition containing alumina, molybdenum, cobalt and zinc or nickel. The catalysts were prepared following the procedure of Example I, except that in the place of silver nitrate zinc or nickel acetate was used. The final calcination was effected in air. Each of the metathesis runs, using octene-1, as charge, was carried out as in Example I. The results obtained are set forth in Table III.

TABLE III

| Run Number | Metal | Weight percent metal in final composition | Molar selectivity to tetradecene-7 |
|---|---|---|---|
| 8 | Zinc | 1.50 | 26.4 |
| 9 | Nickel | 1.40 | 14.8 |

From the above it can be seen that the presence of zinc in the catalyst composition produced no appreciable improvement in the selectivity to tetradecene-7. The presence of nickel in the catalyst system, in fact, resulted in decreased selectivity.

EXAMPLE IV

In a tubular reactor there was placed 45 grams of cobalt-molybdenum-alumina base carrying 1.25 percent by weight of silver prepared as in Example I. Octene-1 was passed upwardly through the reactor and through the catalyst at a liquid hourly space velocity of 1.5 at atmospheric pressure and 120° C. After four hours of operation a sample of the product showed 59.8 molar selectivity to tetradecene-7 at 50.7 percent octene-1 conversion.

Obviously, many modifications and variations of the invention, as hereinabove set forth, can be made without departing from the spirit and scope thereof, and therefore only such limitations should be imposed as are indicated in the appended claims.

We claim:
1. A process for converting, by metathesis, a mono olefin having from four to 12 carbon atoms to a product containing a mixture of olefins of higher and lower carbon number than the olefin charge which comprises contacting such olefin charge with a composition containing essentially alumina, cobalt, molybdenum and silver or copper at a temperature up to about 250° C.

2. The process of claim 1 wherein the olefin charge has from six to 12 carbon atoms.

3. The process of claim 1 wherein the olefin charge is composed of a normal alpha olefin having from four to 12 carbon atoms.

4. The process of claim 1 wherein the olefin charge is composed of a normal alpha olefin having from six to 10 carbon atoms.

5. The process of claim 1 wherein the olefin charge is composed of a normal alpha olefin having from four to 12 carbon atoms and the catalyst is composed of alumina, cobalt, molybdenum and silver.

6. The process of claim 1 wherein the olefin charge is composed of a normal alpha olefin having from four to 12 carbon atoms and the catalyst is composed of alumina, cobalt, molybdenum and copper.

7. The process of claim 1 wherein the olefin charge is composed of a normal alpha olefin having from four to 12 carbon atoms and the catalyst is composed of alumina, about one to about four percent by weight of cobalt, about four to about 12 percent by weight of molybdenum and about 0.1 to about six percent by weight of silver.

8. The process of claim 1 wherein the olefin charge is composed of a normal alpha olefin having from four to 12 carbon atoms and the catalyst is composed of alumina, about two to about three percent by weight of cobalt, about seven to about nine percent by weight of molybdenum and about 0.5 to about three percent by weight of silver.

9. The process of claim 1 wherein the olefin charge is composed of a normal alpha olefin having from four to 12 carbon atoms and the catalyst is composed of alumina, about one to about four percent by weight of cobalt, about four to about 12 percent by weight of molybdenum and about 0.1 to about six percent by weight of copper.

10. The process of claim 1 wherein the olefin charge is composed of a normal alpha olefin having from four to 12 carbon atoms and the catalyst is composed of alumina, about two to about three percent by weight of cobalt, about seven to about nine percent by weight of molybdenum and about 0.5 to about three percent by weight of copper.

11. The process of claim 1 wherein the olefin charge is composed of a normal alpha olefin having from four to 12 carbon atoms and the catalyst is composed of alumina, cobalt, molybdenum and silver and such contact is made at a temperature of about 90° to about 250° C.

12. The process of claim 1 wherein the olefin charge is composed of a normal alpha olefin having from four to 12 carbon atoms and the catalyst is composed of alumina, cobalt, molybdenum and copper and such contact is made at a temperature of about 90° to about 250° C.

13. The process of claim 1 wherein the olefin charge is composed of a normal alpha olefin having from four to 12 carbon atoms and the catalyst is composed of alumina, about one to about four percent by weight of cobalt, about four to about 12 percent by weight of molybdenum and about 0.1 to about six percent by weight of silver and such contact is made at a temperature of about 100° to about 200° C.

14. The process of claim 1 wherein the olefin charge is composed of a normal alpha olefin having from four to 12 carbon atoms and the catalyst is composed of alumina, about two to about three percent by weight of cobalt, about seven to about nine percent by weight of molybdenum and about 0.5 to about three percent by weight of silver and such contact is made at a temperature of about 100° to about 200° C.

15. The process of claim 1 wherein the olefin charge is composed of a normal alpha olefin having from four to 12 carbon atoms and the catalyst is composed of alumina, about one to about four percent by weight of cobalt, about four to about 12 percent by weight of molybdenum and about 0.1 to about six percent by weight of copper and such contact is made at a temperature of about 100° to about 200° C.

16. The process of claim 1 wherein the olefin charge is composed of a normal alpha olefin having from four to 12 carbon atoms and the catalyst is composed of alumina, about two to about three percent by weight of cobalt, about seven to about nine percent by weight of molybdenum and about 0.5 to about three percent by weight of copper and such contact is made at a temperature of about 100° to about 200° C.

References Cited
UNITED STATES PATENTS

| | | | |
|---|---|---|---|
| 2,897,135 | 7/1959 | Doumani | 208—112 |
| 2,948,755 | 8/1960 | Schmerling | 252—470 |
| 3,177,257 | 4/1965 | Detling et al. | 252—470 |
| 3,261,879 | 1/1966 | Banks | 260—683 |
| 3,445,541 | 5/1969 | Heckelsberg et al. | 260—683 |
| 3,297,588 | 1/1967 | Kehl et al. | 252—465 |
| 3,397,154 | 8/1968 | Talsma | 252—465 |

DELBERT E. GANTZ, Primary Examiner

C. E. SPRESSER, JR., Assistant Examiner

U.S. Cl. X.R.

252—465, 470, 476; 260—666 A